United States Patent [19]
Vance

[11] Patent Number: 5,588,245
[45] Date of Patent: Dec. 31, 1996

[54] FISHING LURE PROTECTIVE CONTAINER

[76] Inventor: Joseph E. Vance, 1113 Como Pl., St. Paul, Minn. 55103

[21] Appl. No.: 454,829

[22] Filed: May 31, 1995

[51] Int. Cl.⁶ .................................................. A01K 97/06
[52] U.S. Cl. ..................................... 43/25.2; 43/57.1
[58] Field of Search ............................. 43/25.2, 57.1; 224/920; 220/475; 206/315.11; D22/134, 139

[56] References Cited

U.S. PATENT DOCUMENTS

| | | | |
|---|---|---|---|
| D. 275,338 | 9/1984 | Bailey | D22/139 |
| 3,199,243 | 8/1965 | Caston | 43/25.2 |
| 4,216,604 | 8/1980 | Starke | 43/25.2 |
| 4,418,490 | 12/1983 | Ancona | 43/25.2 |
| 4,441,274 | 4/1984 | Masur | 43/25.2 |
| 4,920,683 | 5/1990 | Weber | 43/25.2 |
| 5,199,208 | 4/1993 | Matchette | 43/25.2 |
| 5,235,775 | 8/1993 | Daughtry | 43/25.2 |

*Primary Examiner*—J. Elpel
*Attorney, Agent, or Firm*—Robert C. Baker; Jeffrey A. Proehl

[57] ABSTRACT

A container for protecting a fishing lure from entanglement with other fishing tackle without removing the lure from its attachment to a fishing line of a fishing rod. The container comprises a relatively stiff longitudinal perimeter wall structure and spaced end walls transverse to the perimeter wall structure. The perimeter wall structure is split longitudinally into two container parts. The container may be removably mounted on a fishing rod by pivot closure of the container parts about the fishing rod shaft so as to form a protective fishing lure chamber. At least one of the transverse end walls is formed of a deformable material such that mounting the container on a fishing rod shaft causes the deformable end wall to transversely press against the rod shaft in a frictionally engaging manner that resists longitudinal slippage of the container along the rod shaft.

20 Claims, 1 Drawing Sheet

FISHING LURE PROTECTIVE CONTAINER

BACKGROUND OF THE INVENTION

This invention relates generally to a container for protecting a fishing lure from entanglement with other fishing tackle without removing the lure from its attachment to a fishing line of a fishing rod, and more particularly relates to such a container with a built-in feature for resisting longitudinal slippage of the container along the fishing rod.

Fishing lures typically comprise an artificial bait (such as a simulated insect or fish or other fish attracting object) with one or more hooks mounted thereon for hooking in the mouth of a fish attempting to bite the fishing lure. A most convenient practice is to store and transport the fishing tackle in a ready-to-use configuration with the fishing lure attached to the end of the fishing line installed on the fishing rod. However, the hooks of a fishing lure are exposed and can easily become entangled with and damage other fishing tackle or the environment in which the fishing rod is stored and transported (such as the interior of the angler's vehicle). The hooks also have sharp barbs that can injure the skin of anyone who comes in contact with the lure. Once the lure becomes entangled, the angler must engage in the frustrating task of untangling the fishing lure before fishing.

Fishing rod mountable devices to store fishing lures have been heretofore proposed. However, known devices which simply "piggyback" on the fishing rod shaft do not provide the security and stability of devices that wrap around and enclose a portion of the fishing rod shaft. But known rod-enclosing devices have fixed size openings for receiving the rod shaft. Since the diameter of a typical rod shaft tapers dramatically from the larger butt end to the smaller tip end, a device with fixed size openings can securely fit only one or a few locations along the rod shaft, if the device is capable of fitting the rod shaft at all. An unsecure fit allows the device to slip longitudinally along the rod shaft and wobble laterally against the rod shaft. Indeed, establishing an adequately secure fit on a rod shaft using the fixed size openings of these devices might damage the surface of the rod shaft.

The art has been without a solution to these problems, although anglers have long wanted a secure and versatile lure protective device effective to ensure safe storage and transport of a lure attached to the line of a fishing rod without creating entanglement problems.

SUMMARY OF THE INVENTION

The invention provides a container for protecting a fishing lure from entanglement with other fishing tackle without removing the lure from its attachment to a fishing line of a fishing rod. A fishing rod useful in practicing the invention has an elongate rod shaft with guide rings through which the fishing line is threaded. The new container comprises a relatively stiff longitudinal perimeter wall structure and spaced end walls transverse to the perimeter wall structure. The perimeter wall structure of the container is split longitudinally into two container parts hinged along a longitudinal axis to permit pivot opening and closure of the parts, and thereby permit removable mounting of the container in a longitudinal manner on a fishing rod by pivot closure of the container parts about the fishing rod shaft so as to form a protective fishing lure chamber. At least one of the transverse end walls of the container is formed of a deformable material such that mounting the container on a fishing rod shaft causes the deformable end wall to transversely press against the rod shaft in a frictionally engaging manner. The frictional engagement resists longitudinal slippage of the container along the rod shaft.

In the preferred container, the deformable transverse end wall has sufficient resiliency to return to a non-deformed state after a fishing rod shaft is removed from pressing contact with said deformable end wall. Each transverse end wall is preferably formed of a deformable material and the end walls have no preformed openings therein for receiving a fishing rod shaft.

The invention also provides a new combination of a fishing rod, a fishing lure and the new container for protecting the fishing lure.

The most preferred container of the invention has an auxiliary wall located longitudinally outward from each transverse end wall, with each auxiliary wall having an opening therein for passage of a fishing rod shaft therethrough. A guide ring of a fishing rod is placed between a transverse end wall and the adjacent auxiliary wall as a further relationship for limiting longitudinal movement of the container along the rod shaft.

Still other features and benefits of the invention will be evident as this description proceeds.

DESCRIPTION OF THE PREFERRED EMBODIMENT

Figure 1:
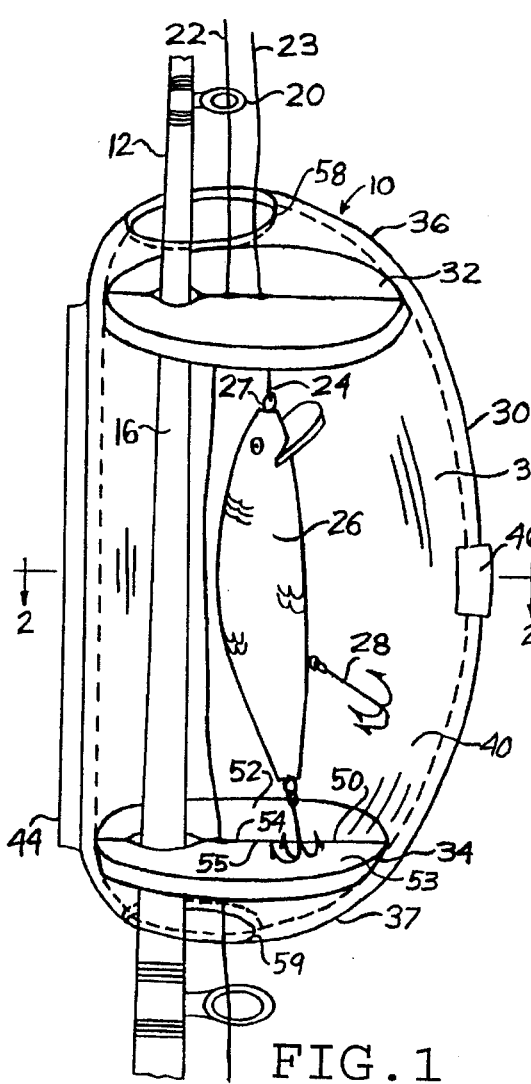
FIG. 1 is a schematic perspective view of the protective lure container of the invention having transparent walls through which a fishing lure and a portion of a fishing rod, partially broken away, are visible.

As shown in FIG. 1, the protective container 10 of the invention is removably mountable on a fishing rod 12 and holds a fishing lure 26 attached to the fishing line 23 of the rod 12.

Figure 3:
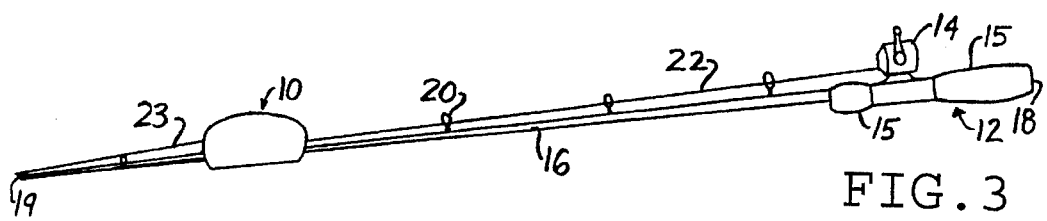
FIG. 3 is a schematic perspective view of a fishing rod having the container mounted thereon.

A fishing rod 12 useful for the practice of the invention (see FIG. 3) is comprised of an elongate slender rod shaft 16 having opposite butt 18 and tip 19 ends. The diameter of the typical rod shaft 16 tapers significantly and continuously between the thicker butt end 18 and the thinner tip end 19. A fishing reel 14 is typically mounted on the rod shaft 16 between segments of the rod handle 15 and has a length of fishing line 22 spooled thereon. A series of guide eyes or rings 20 are mounted on the rod shaft 16 at longitudinally spaced locations, with the diameter of the apertures in the guide rings gradually decreasing in size as the rings are located closer to the tip end 19. A length 22 of the fishing line is threaded through each of the guide rings and is guided along the rod shaft 16 by the rings. An unguided or free length 23 of the fishing line extends beyond the guide ring at the tip end 19 and terminates in a free end 24 (see FIG. 1). A fishing lure 26 (at its attachment eye 27) is typically attached to the free end 24 or a leader attached to the free end. The fishing lure 26 typically has one or more hooks 28 mounted thereon for hooking in the mouth flesh of a fish attempting to bite on the lure 26.

Figure 2:
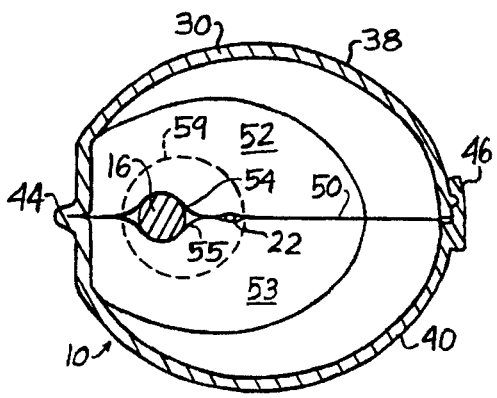
FIG. 2 is a schematic sectional view taken along line 2—2 of FIG. 1 (with the fishing lure omitted) and particularly illustrating a deformable transverse end wall of the invention pressing against a fishing rod shaft and a fishing line.

The protective container 10 of the invention has a perimeter wall structure 30 about a central space within the container (see FIGS. 1 and 2). The perimeter wall structure is comprised of generally longitudinally extending walls that form a continuous laterally spaced perimeter or boundary around a longitudinal axis of the container 10. Illustratively, the perimeter wall structure 30 may be generally cylindrical or have a transverse cross sectional shape that approximates an oval. The perimeter wall structure is formed of a relatively stiff and rigid material that is suitably strong to resist crushing forces that would damage a lure. The ideal perimeter wall structure is at least translucent to light (and preferably is transparent) to permit viewing of the lure without opening the container, but opaque walls may be used.

Planar end walls 32, 34 are fixed to the perimeter wall structure 30 in an orientation substantially transverse to the longitudinal walls of the structure 30. The transverse end walls 32, 34 are located at or near or proximate to the longitudinal ends of the perimeter wall structure and are longitudinally spaced from and substantially parallel to each other. The perimeter wall structure 30 and the transverse end walls 32, 34 collectively form an internal protective chamber 35 for holding a fishing lure 26 therein without permitting the lure hooks 28 to contact or be exposed to objects outside the container 10. The interior of the protective chamber 35 is suitably large to accommodate one (or possibly more than one) fishing lure 26.

In the preferred embodiment, the longitudinal walls of the perimeter wall structure 30 are extended longitudinally outward and beyond the transverse end walls 32, 34 and curve inwardly to form auxiliary transverse walls 36, 37. The auxiliary walls 36, 37 ideally taper or slant laterally inward toward the central longitudinal axis of the container 10, giving the container a generally oblong oval shape that gradually becomes smaller and narrower near the longitudinal end regions of the container. The rounded and tapered shape makes the container less likely to catch on or lodge against other objects while being transported or stored. Somewhat angular shapes may optionally be employed, if desired.

Each transverse auxiliary wall 36, 37 has a substantially circular end opening 58, 59 therein which permits a fishing rod shaft 16 to pass through the relatively stiff auxiliary wall. The preferred end openings 58, 59 have a size relatively large in relation to the diameter of the rod shaft 16. In fact, the most preferred end openings 58, 59 are larger in size than the diameter of the rod shaft 16 at any location along it between the rod handle 15 and the tip end 19, to thereby permit mounting of the container 10 at any of these locations. Illustratively, the end opening 58 may have a diameter about twice or even possibly 3 to 4 times or more larger than the maximum diameter of the fishing rod shaft 16. Although an end opening 58, 59 may be large enough to allow one to slide the rod and a guide ring through it, the most preferred end openings are insufficiently large to accommodate both the rod and one or more of the guide rings along the shaft of the rod.

The end openings 58, 59 are preferably offset from a centered location along the central longitudinal axis of the container so that a rod shaft 16 extending through the container 10 may be positioned off to one side of the protective lure interior chamber 35 to maximize the unobstructed space available for the lure 26.

The perimeter wall structure 30 is longitudinally split or divided into two container parts 38, 40. The container parts 38, 40 are hinged together along a longitudinal axis to permit the container parts to pivot with respect to each other between an open position and a closed position in a manner similar to a clamshell or jaw structure.

The container is preferably split along a longitudinal plane (e.g., a plane generally parallel to the walls of the perimeter wall structure 30 and bisecting the structure). It ideally is split along an axis of symmetry to form essentially symmetric container parts 38, 40 that are substantially identical in shape but oppositely oriented. (Asymmetrical container parts as well as parts not divided along a plane may optionally be used.) Each container part has longitudinal rim edges that meet or contact the longitudinal rim edges of the other container part when the parts of the container are pivoted into a closed position. For example, container part 38 has rim edges 42 and 43 which abut against rim edges 42A and 43A of container part 40; see FIG.

Figure 4:
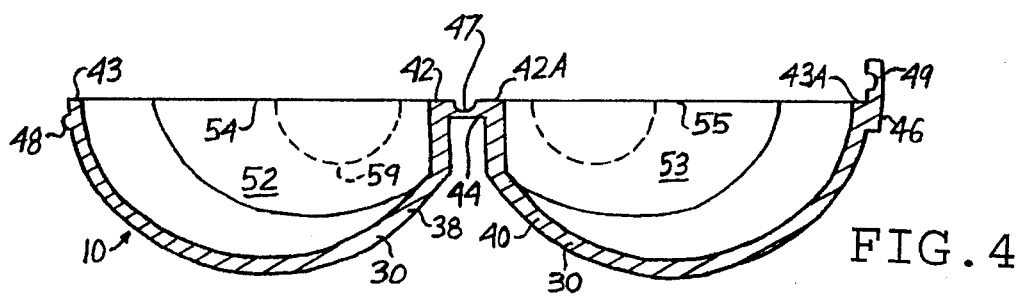
FIG. 4 is a schematic sectional view of the container in an open position taken along a line generally corresponding to line 2—2 of FIG. 1.

In the illustrative embodiment, the perimeter wall structure 30 (see FIG. 4) of both container parts 38, 40 and a hinge 44 are formed from a single piece of material with the longitudinal rim edges 42, 42A of the parts being connected by a relatively narrow web or strip of material functioning as a living hinge 44. A longitudinally extending bend region (e.g., a longitudinal channel 47) in the hinge strip 44 has a reduced and relatively thin material thickness that permits the relatively stiff material of the perimeter wall structure 30 to be readily bent along the bend region to bring the corresponding rim edges 42, 42A and 43, 43A of the container parts together. (Plastics such as polyethylene permit this performance.) The container parts and hinges could also be comprised of multiple pieces.

Latching means are employed on the longitudinal rim edges 43, 43A to releasibly hold the container parts in a closed position. Illustratively, the latching means comprise a releasable clasp 46 (see FIGS. 2 and 4) having a raised nub 48 on the container part 38 which engages a detent on a finger 49 extending from the container part 40.

In the preferred embodiment, each transverse end wall 32, 34 is formed of split parts as illustrated. For example, end wall 34 is split or divided into two wall sections 52, 53 (see FIGS. 1, 2 and 4) which abut at a juncture 50. The juncture 50 ideally lies in substantially the same longitudinal plane that divides the perimeter wall structure 30 into container parts 38, 40. Each end wall section 52, 53 of an end wall is bonded or otherwise fixedly mounted on an opposite container part in a position to extend transversely of the longitudinal length of the container and in an aligned relationship to the other end wall section.

A critically significant feature of the invention is the deformable character of at least one of the transverse end walls, and preferably both of them. The material of the deformable end walls, while deformable to conform or substantially conform to the general shape of the surface of an object (e.g., a rod) against which the material is pressed, is not permanently deformed by such action. The material has sufficient resiliency to return to a non-deformed state after deformation. This return to a non-deformed state is critically significant, for it permits the deformable end walls to regain their property of exerting pressure on a fishing rod of different diameter during periods of time when the container is removed from a rod (i.e., during times of fishing).

The materials out of which the container may be formed can vary. The most preferred materials are plastics sometimes referred to as organic plastics (including thermoplastics). Heat-softenable plastic materials permit a variety of different molding techniques to be employed in manufacturing the perimeter wall structure 30. Many different plastics may be employed. Experts are aware of such plastics. Some are: polyethylene, polypropylene, polystyrene, and vinyl types. The most ideal plastics, however, for fabricating the perimeter wall structure are those that combine the attributes of low cost and receptiveness for unification of the deformable transverse end walls to them.

The transverse deformable end walls 32, 34 preferably are made from rubber or rubber-like materials, including both natural and synthetic elastomers that possess the yieldability and resiliency to return to a non-deformed state in the manner described above. They may be foamed or non-foamed, porous or non-porous. Interestingly, some plastic polymers when fabricated into thin sheets exhibit the minimal requirements for the deformable wall structure in terms of flexibility for deformation and sufficient resiliency to return to a non-deformed state after deformation. Thus, it is conceivable that the perimeter wall structure as well as the deformable transverse wall parts of the container may be formed from plastics material having the same polymeric character. This permits unification of the transverse deformable walls with the perimeter structure in a manner associated with heat sealing or fusion of the parts together. Even when the perimeter structure and deformable walls are formed of different polymeric materials, it is in some instances possible to seal by heat or fusion. On the other hand, bonding of the parts together or fixing them and unifying them by means of an adhesive is also useful. There are many technological advancements dealing with means for such bonding, and the specific means or specific adhesives employed may vary consistent with those advancements.

The preferred deformable end wall 34 (see FIGS. 1, 2 and 4) has a deformable abutment surface 54 on one wall section 52 that preferably abuts against a deformable abutment surface 55 on the other wall section 53 when the container parts 38, 40 are in a closed position. The preferred abutment surfaces 54, 55 are substantially straight and planar before deformation by a rod shaft 16 and have no preformed openings or notches of fixed size and shape in their surfaces for receiving the rod shaft.

When the container parts 38, 40 are closed about or around a rod shaft (see FIGS. 1 and 2), the transverse abutment surfaces 54, 55 abut and press against or pinch the rod shaft. In turn, the hard rod shaft is pressed against the surfaces 54, 55 and deforms the wall sections until there is sufficient space between the surfaces for the rod shaft. The abutment surfaces 54, 55 also press against the fishing line 22 carried by the guide rings on the rod shaft and also against the free line length 23. The resulting deformation in the end wall sections will vary depending on the particular size and shape of the rod shaft at the container location and is not a fixed amount.

The pressure exerted by the deformable abutment surfaces 54, 55 on the rod shaft (and fishing line) produces a frictional engagement between the abutment surfaces and the rod shaft that resists longitudinal movement of the rod shaft with respect to the end wall sections and thereby resists longitudinal movement or slippage of the container 10 along the rod shaft. The transverse pressure exerted on the rod shaft also resists transverse or lateral movement (e.g., wobbling) of the container on the rod shaft.

Each end wall 32, 34 of the most preferred container is deformable so as to maximize frictional engagement or grip by the end walls on the fishing rod shaft. The magnitude or strength of the frictional engagement of the end walls with the rod shaft can be varied, for example, by employing thicker or thinner deformable walls or by forming the walls from a material having a greater or lesser degree of frictional grab, along with other factors.

The frictional engagement by the deformable end walls on a rod shaft permits the lure container 10 to be positioned at virtually any desired location on the rod shaft, even a location entirely between two adjacent guide rings, more or less regardless of the size of the tapered rod shaft at that particular location.

Figure 5:
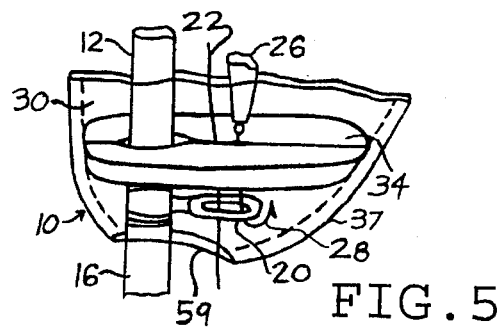
FIG. 5 is a schematic side view of a broken away portion of the container particularly illustrating an optional positioning of a guide ring of the fishing rod shaft between a transverse end wall and an auxiliary transverse wall of the container.
Figure 6:
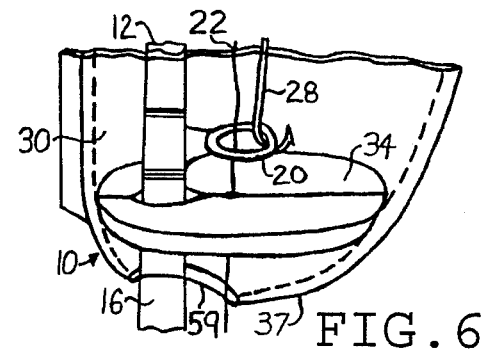
FIG. 6 is a schematic side view of a broken away portion of the container particularly illustrating an optional positioning of a guide ring of the fishing rod shaft within the fishing lure chamber with a hook of a fishing lure hooked on the guide ring.

A further feature of the most preferred container is that of utilizing an auxiliary wall end opening 58, 59 to inhibit or further resist longitudinal slippage of the container along the rod shaft 16, provided the end opening 58, 59 is too small to allow passage of the guide ring therethrough (see FIG. 5). A guide ring 20 that is larger in size than the size of the end opening 59 in the auxiliary wall 37 (i.e., a guide ring that is too large to move or fit through the end opening) may be located between the transverse end wall 34 and the nearby or adjacent auxiliary wall 37. Upon pivot closure of the container parts, the guide ring is held or trapped between the deformable end wall 34 and auxiliary wall 37. This results in a relationship which provides additional resistance to slippage by the container 10 on the rod shaft 16. The relationship also functions as a protector for the eye ring in the sub-chamber of the container. As an option, the hook 28 of the fishing lure 26 may be hooked on a guide ring 20 and tension applied to the fishing line (by means of the fishing reel) to thereby maintain the lengths 22, 23 of fishing line in a taut condition to reduce the possibility of the fishing line becoming slack and entangled with other tackle. The guide ring on which the hook is hooked may optionally (and even preferably) be located between the transverse deformable end walls 32, 34 (i.e., within the protective lure chamber 35). (See FIG. 6.)

The container 10 thus is useful for protecting a fishing lure 26 from entanglement with other tackle (such as fishing rods, fishing line, hooks, lures, and the like) without having to remove the lure from its attachment to the fishing line of the fishing rod. The operation of removably mounting the container on a fishing rod shaft 16 requires that the container be initially pivoted into an open position (see FIG. 4). The lure 26 is placed between the longitudinally spaced deformable wall sections and within the area of the generally concave perimeter wall structure portion of one container part such that the lure will be cradled in the protective chamber portion of the container part on closure of the container. Simultaneously, the free length 23 of fishing line may be laid across (e.g., placed on top of) the abutment surface of one of the transverse end wall sections and aligned with an auxiliary wall end opening. The fishing rod shaft 16 (and optionally the guided length 22 of fishing line) is placed across and on top of the abutment surfaces of the deformable wall sections of the container part cradling the fishing lure. The rod shaft 16 is generally aligned with the auxiliary wall end openings 58 and 59. The container parts are pivoted together (see FIG. 1) into a closed position with the abutment surface of each deformable end wall section contacting and transversely pressing against the rod shaft 16 (and the guided 22 and free 23 lengths of the fishing line). The elements of the releasable clasp 46 on the container parts 38, 40 are brought together to thereby hold the container in closed condition and to press the deformable end wall sections against the rod shaft 16 to frictionally engage the surface of the rod shaft.

Those skilled in the art will readily recognize that this invention may be embodied in still other specific forms than illustrated without departing from the spirit or essential characteristics of it. The illustrated embodiment is therefore to be considered illustrative and not restrictive, the scope of the invention being indicated by the appended claims rather than the foregoing description; and all variations that come within the meaning and range of equivalency of the claims are intended to be embraced thereby.

That which is claimed is:

1. A container for protecting a fishing lure from entanglement with other fishing tackle without removing the lure from its attachment to a fishing line of a fishing rod of the type having an elongate rod shaft with guide rings through which the fishing line is threaded, said container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, thereby to permit removable mounting of said container in a longitudinal manner on a fishing rod by pivot closure of said container parts about the fishing rod shaft so as to form a protective fishing lure chamber, said container being mountable on a fishing rod shaft with the rod shaft passing through said container so as to permit mounting of said container at varied locations along said rod shaft, at least one of said transverse end walls of the container being formed of a deformable material such that said mounting of said container on a fishing rod shaft causes said deformable end wall to transversely pinch and deform against said rod shaft in a frictionally engaging manner, said frictional engagement being such as to resist longitudinal slippage of said container along said rod shaft.

2. The container of claim 1 wherein said deformable transverse end wall has sufficient resiliency to return to a non-deformed state after a fishing rod shaft is removed from said deformable end wall.

3. The container of claim 1 wherein each said transverse end wall is formed of a deformable material and said end walls have no preformed openings therein for receiving a fishing rod shaft.

4. The container of claim 1 wherein each said transverse end wall is deformable and divided into two deformable wall sections, each said wall section of a said end wall being mounted on an opposite container part such that said wall sections are moved toward each other upon pivot closure of said container parts.

5. The container of claim 4 wherein said transverse end wall sections have no preformed opening therebetween for receiving a fishing rod shaft.

6. The container of claim 1 wherein said perimeter wall structure additionally comprises an auxiliary wall located longitudinally outward from each said transverse end wall, said auxiliary walls each having an opening therein for passage of a fishing rod shaft therethrough.

7. The combination of:

a fishing rod comprising an elongate rod shaft having guide rings mounted thereon with a fishing line threaded through said guide rings and terminating in a free end, a fishing lure attached to said free end of said fishing line, and a container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, said container being removably mounted in a longitudinal manner on said fishing rod by pivot closure of said container parts about said fishing rod shaft so as to form a protective fishing lure chamber within which said lure is held, said container being mountable on said fishing rod shaft with said rod shaft passing through said container so as to permit mounting of said container at various locations along said rod shaft, at least one of said transverse end walls of the container being formed of a deformable material such that said deformable end wall transversely pinches and deforms against said rod shaft in a frictionally engaging manner, said frictional engagement being such as to resist longitudinal slippage of said container along said rod shaft.

8. The combination of claim 7 wherein said container is mounted entirely between a pair of adjacent guide rings on said rod shaft.

9. The combination of claim 7 wherein said one deformable end wall presses against the fishing line extending through said protective fishing lure chamber in a frictionally engaging manner so as to resist longitudinal movement of said fishing line through said container.

10. The combination of claim 7 wherein said fishing lure includes a hook hooked on a guide ring located within said fishing lure chamber, and wherein said fishing line is in a substantially taut condition.

11. The combination of claim 7 wherein said fishing lure includes a hook hooked on a guide ring located outside said fishing lure chamber.

12. The combination of claim 7 wherein the perimeter wall structure of said container additionally comprises an auxiliary wall located longitudinally outward from each said transverse end wall, each said auxiliary wall having an opening therein through which said fishing rod shaft passes.

13. The combination of claim 12 wherein a guide ring of said fishing rod shaft is located between a transverse end wall and the adjacent said auxiliary wall as a further relationship for limiting longitudinal movement of said container along said rod shaft.

14. A container for protecting a fishing lure from entanglement with other fishing tackle without removing the lure from its attachment to a fishing line of a fishing rod of the type having an elongate rod shaft with guide rings through which the fishing line is threaded, said container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, thereby to permit removable mounting of said container in a longitudinal manner on a fishing rod by pivot closure of said container parts about the fishing rod shaft so as to form a protective fishing lure chamber, each said transverse end wall of the container being formed of a deformable material such that said mounting of said container on a fishing rod shaft causes each said deformable end wall to transversely press against said rod shaft in a frictionally engaging manner, said frictional engagement being such as to resist longitudinal slippage of said container along said rod shaft, and wherein said end walls have no preformed openings therein for receiving a fishing rod shaft.

15. A container for protecting a fishing lure from entanglement with other fishing tackle without removing the lure from its attachment to a fishing line of a fishing rod of the type having an elongate rod shaft with guide rings through which the fishing line is threaded, said container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, thereby to permit removable mounting of said container in a longitudinal manner on a fishing rod by pivot closure of said container parts about the fishing rod shaft so as to form a protective fishing lure chamber, each said transverse end wall of the container being formed of a deformable material such that said mounting of said container on a fishing rod shaft causes each said deformable end wall to transversely press against said rod shaft in a frictionally engaging manner, said frictional engagement being such as to resist longitudinal slippage of said container along said rod shaft, wherein each said transverse end wall is divided into two deformable wall sections, each said wall section of a said end wall being mounted on an opposite container part such that said wall sections are moved toward each other upon pivot closure of said container parts, and wherein said transverse end wall sections have no preformed opening therebetween for receiving a fishing rod shaft.

16. A container for protecting a fishing lure from entanglement with other fishing tackle without removing the lure from its attachment to a fishing line of a fishing rod of the type having an elongate rod shaft with guide rings through which the fishing line is threaded, said container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, thereby to permit removable mounting of said container in a longitudinal manner on a fishing rod by pivot closure of said container parts about the fishing rod shaft so as to form a protective fishing lure chamber, at least one of said transverse end walls of the container being formed of a deformable material such that said mounting of said container on a fishing rod shaft causes said deformable end wall to transversely press against said rod shaft in a frictionally engaging manner, said frictional engagement being such as to resist longitudinal slippage of said container along said rod shaft, and wherein said perimeter wall structure additionally comprises an auxiliary wall located longitudinally outward from each said transverse end wall, said auxiliary walls each having an opening therein for passage of a fishing rod shaft therethrough.

17. The combination of:
a fishing rod comprising an elongate rod shaft having guide rings mounted thereon with a fishing line threaded through said guide rings and terminating in a free end, a fishing lure attached to said free end of said fishing line, and a container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, said container being removably mounted in a longitudinal manner on said fishing rod by pivot closure of said container parts about said fishing rod shaft so as to form a protective fishing lure chamber within which said lure is held, at least one of said transverse end walls of the container being formed of a deformable material such that said deformable end wall transversely presses against said rod shaft in a frictionally engaging manner, said frictional engagement being such as to resist longitudinal slippage of said container along said rod shaft, wherein said container is mounted entirely between a pair of adjacent guide rings on said rod shaft.

18. The combination of:
a fishing rod comprising an elongate rod shaft having guide rings mounted thereon with a fishing line threaded through said guide rings and terminating in a free end, a fishing lure attached to said free end of said fishing line, and a container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, said container being removably mounted in a longitudinal manner on said fishing rod by pivot closure of said container parts about said fishing rod shaft so as to form a protective fishing lure chamber within which said lure is held, at least one of said transverse end walls of the container being formed of a deformable material such that said deformable end wall transversely presses against said rod shaft in a frictionally engaging manner, said frictional engagement being such as to resist longitudinal slippage of said container along said rod shaft, wherein said deformable end wall presses against the fishing line extending through said protective fishing lure chamber in a frictionally engaging manner so as to resist longitudinal movement of said fishing line through said container.

19. The combination of:
a fishing rod comprising an elongate rod shaft having guide rings mounted thereon with a fishing line threaded through said guide rings and terminating in a free end, a fishing lure attached to said free end of said fishing line, and a container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, said container being removably mounted in a longitudinal manner on said fishing rod by pivot closure of said container parts about said fishing rod shaft so as to form a protective fishing lure chamber within which said lure is held, at least one of said transverse end walls of the container being formed of a deformable material such that said deformable end wall transversely presses against said rod shaft in a frictionally engaging manner, said frictional engagement being such as to resist longitudinal slippage of said container along said rod shaft, wherein the perimeter wall structure of said container additionally comprises an auxiliary wall located longitudinally outward from each said transverse end wall, each said auxiliary wall having an opening therein through which said fishing rod shaft passes.

20. The combination of:

a fishing rod comprising an elongate rod shaft having guide rings mounted thereon with a fishing line threaded through said guide rings and terminating in a free end, a fishing lure attached to said free end of said fishing line, and a container comprising a relatively stiff longitudinal perimeter wall structure and spaced end walls transverse to said perimeter wall structure, said perimeter wall structure of said container being split longitudinally into two container parts hinged along a longitudinal axis to permit pivot opening and closure of the parts, said container being removably mounted in a longitudinal manner on said fishing rod by pivot closure of said container parts about said fishing rod shaft so as to form a protective fishing lure chamber within which said lure is held, at least one of said transverse end walls of the container being formed of a deformable material such that said deformable end wall transversely presses against said rod shaft in a frictionally engaging manner, said frictional engagement being such as to resist longitudinal slippage of said container along said rod shaft, wherein the perimeter wall structure of said container additionally comprises an auxiliary wall located longitudinally outward from each said transverse end wall, each said auxiliary wall having an opening therein through which said fishing rod shaft passes, and wherein a guide ring of said fishing rod shaft is located between a transverse end wall and the adjacent said auxiliary wall as a further relationship for limiting longitudinal movement of said container along said rod shaft.

* * * * *